United States Patent [19]
Christie

[11] 3,881,754
[45] May 6, 1975

[54] RESILIENT INTERNAL SUPPORT FOR PLASTIC PIPE

[76] Inventor: Joe William Christie, 1118 E. Main St., Frisco, Tex.

[22] Filed: Sept. 26, 1973

[21] Appl. No.: 400,721

Related U.S. Application Data

[63] Continuation of Ser. No. 140,689, May 6, 1971, abandoned.

[52] U.S. Cl. ................................. 285/114; 285/248
[51] Int. Cl. ............................................. F16l 13/04
[58] Field of Search ........... 285/114, 115, 116, 248; 138/139; 29/428

[56] References Cited
UNITED STATES PATENTS

| 616,808 | 12/1898 | Ricketts | 285/248 |
| 790,971 | 5/1905 | Nicholls | 285/115 |
| 2,949,133 | 8/1960 | Rothermel et al. | 138/139 |

*Primary Examiner*—Dave W. Arola
*Attorney, Agent, or Firm*—Clegg, Cantrell & Crisman

[57] ABSTRACT

An internal resilient support for reinforcing plastic pipe to prevent failure of the pipe externally adjacent its connection to a rigid pressure coupling or other pressure fitting comprising a helical member having contiguous convolutions and intimately surrounded by a separate semi-elastic sheath which limits flexure and/or deformation of the member whereby extensive bending of the support with the pipe is permitted without damage to either.

2 Claims, 3 Drawing Figures

PATENTED MAY 6 1975  3,881,754

INVENTOR
Joe William Christie

BY  Ashley & Ashley

ATTORNEYS

RESILIENT INTERNAL SUPPORT FOR PLASTIC PIPE

SUMMARY OF THE INVENTION

This application is a continuation of my copending United States application Ser. No. 140,689, filed May 6, 1971 entitled Resilient Internal Support for Plastic Pipe and now abandoned.

A novel internal support or stiffener for reinforcing plastic pipe at its connection to a rigid pressure coupling or other pressure fitting which has sufficient resiliency to flex with the pipe relative to the coupling so as to prevent failure of said pipe upon bending thereof adjacent said coupling. Heretofore, internal pipe stiffeners have been so rigid that the bending of pipe adjacent a pressure coupling or other pressure fitting concentrated the flexure of the pipe at the outer end of the stiffener and resulted in failure of said pipe at this point. Although numerous external helical means have been employed to spread the bending of the pipe over an amplified area, no one has conceived a commercially successful internal resilient support for plastic pipe whereby only rigid stiffeners are in general use at the present time. The expression "pressure coupling" is used in a generic sense and is intended to include all types of pressure fittings, such as adapters, elbows and tees as well as double-ended couplings, having frictional clamping means for connecting plastic pipe thereto and requiring internal supports or stiffeners to prevent undue distortion to the pipe. Also, the expression "plastic pipe" includes all types of flexible and semi-rigid conductors of any material requiring the use of pressure couplings and other pressure fittings having clamping means.

The novel internal support of this invention includes a helical resilient member or core suitable metal having abutting or contiguous convolutions encased in a separate membrane or sheath of semi-elastic thin material, whereby the member and sheath may undergo limited movement relative to each other without damage to either or to the pipe. The helical member provides resiliency for flexure with the pipe and sufficient strength to withstand deformation of said pipe by the clamping means of the pressure coupling, and the membrane or sheath prevents undue flexure of the resilient member. Being separate from or free from attachment to the helical member, the semi-elasticity of the sheath distributes the bending of said member over an amplified area of said sheath so as to prevent concentrated flexure of either. Accordingly, the resilient support reinforces the pipe and the sheath reinforces the helical member.

A construction designed to carry out the invention is described hereinafter together with other features thereof.

DESCRIPTION OF THE PREFERRED EMBODIMENT

Figure 1:
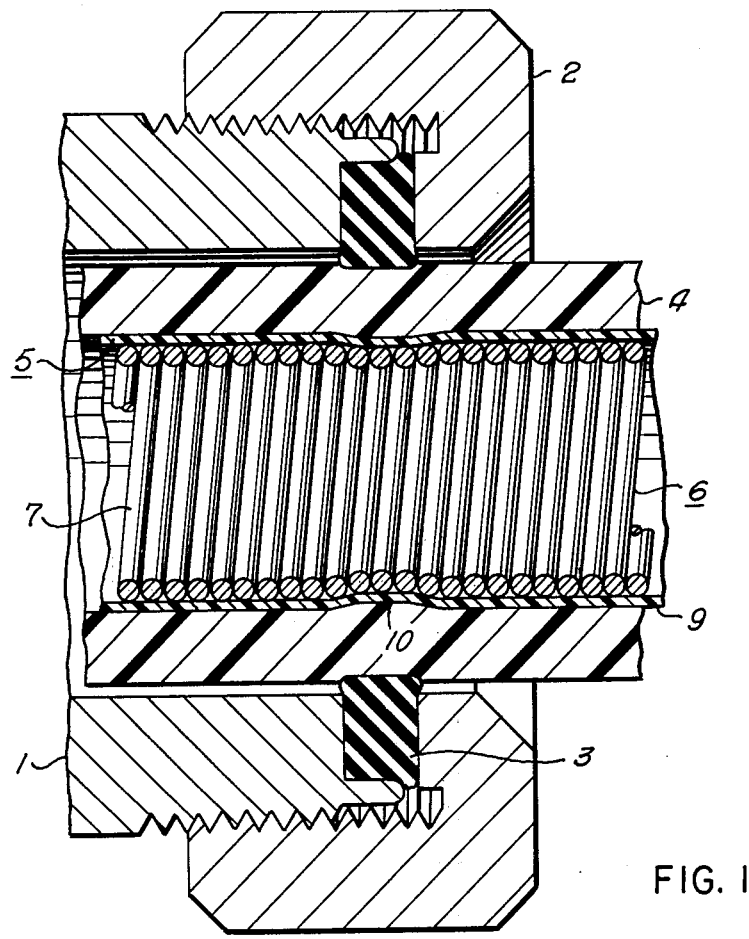
FIG. 1 is a transverse sectional view of the clamping portion of a typical pressure coupling or fitting having therein an internal resilient support constructed in accordance with the invention.

In the drawing, the numeral 1 designates one end portion of a conventional high pressure pipe fitting having a nut 2 screwthreaded thereon for compressing an annular packing ring or gasket 3 into frictional clamping engagement with a pipe 4, of plastic or other suitable material, for sealing off therearound. Although not illustrated, the fitting 1 may have more positive clamping means for securing the pipe end therein. It is customary to insert a rigid stiffener within the end of flexible or semi-rigid pipe to prevent deformation of said pipe by the clamping means of a high pressure fitting. Due to the rigidity of the stiffener, a stress is created in the pipe adjacent the outer end of said stiffener when said pipe is bent or flexed relative to the fitting and results in cracking and failure of said pipe at or near such point. It is noted that the pipe may become fatigued from numerous flexures of relatively small amplitude as well as from more infrequent flexures of relatively large amplitude.

Figure 2:
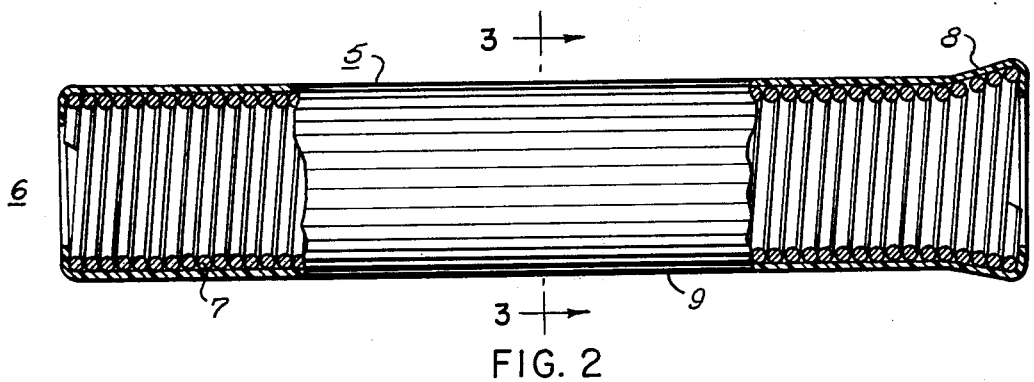
FIG. 2 is a side elevational view, partly in section, of the support.
Figure 3:
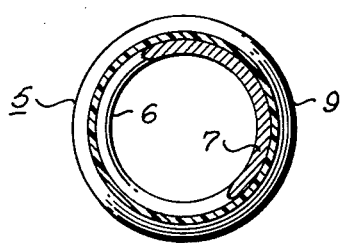
FIG. 3 is a cross-sectional view taken on the line 3—3 of FIG. 2.

In accordance with the principles of this invention, an internal resilient support 5 is provided for reinforcing the pipe without unduly impairing the flexibility thereof and thereby increase the life of said pipe. The support 5 includes a helical resilient member or spring-like core 6 of suitable metal having contiguous or abutting convolutions 7. It is noted that the convolutions 7 are circular in cross-section so as to be wire-like. Although the member 6 is sufficiently flexible to permit bending and elongation thereof, it is sufficiently rigid to withstand undue deformation by the clamping means of the pressure fitting. Of course, the external diameter of the helical member is slightly less than the internal diameter of the pipe to facilitate insertion thereof and its bore is of maximum diameter. If desired, the outer end of the member 6 may be slightly enlarged or flared, as shown at 8 in FIG. 2, to limit the penetration of the support 5 into the end of the pipe 4.

A membrane or sheath 9, of semi-elastic thin material, is adapted to snugly encase the helical member so as to reduce the flexibility of the support sufficiently to prevent undue distortion thereof in use. The sheath 9 may be formed of polyvinylchloride or other suitable extremely thin material capable of being heat shrunk upon the member 6 without adhering to the convolutions 7 thereof, whereby said sheath is skin-like and is separate from or free from attachment to said member. It is noted that the radial thickness of the sheath is much less than the wall thickness of the convolutions 7 so as to be film-like. Due to this separate structure, the member and sheath may undergo slight movement relative to each other without damage to either. Bonding of the sheath to the member is undesirable because any distortion of said member will be concentrated in a small area and said sheath will split due to its thinness. Dipping of the member in coating material has not proved satisfactory due to the bonding of said material to said member and the tendency of the inner portion thereof to flake off.

As shown at 10 in FIG. 1, deformation of the pipe and support by the clamping and/or sealing means is permitted without concentrated distortion of the support; the latter, however, must have sufficient strength to withstand a clamping pressure approximately 1 ½ times the pressure applied internally to the pipe. It is noted that the sheath 9 effectively minimizes distortion of the member 5 and distributes or amplifies the area of flexure or deformation of the support 5 and pipe 4. This is of particular importance at the outer end of the support which is spaced from and unsupported by the fitting. It is at this point that the pipe is subject to the greatest stresses and requires flexible or resilient support over a relatively large area. By the distribution of its flexing or bending movement, the pipe is not subject to premature fatigue at its connection to a fitting. Manifestly, the sheath prevents contact of the helical member with the interior of the pipe so as to minimize wear of said pipe interior.

The foregoing description of the invention is explanatory thereof and various changes in the size, shape and materials, as well as in the details of the illustrated construction may be made, within the scope of the appended claims, without departing from the spirit of the invention.

I claim:

1. In combination, a pressure coupling, a plastic pipe one end of which is clampingly confined in said pressure coupling, and an internal support within the confined end of the pipe, the support including a helical resilient member having contiguous convolutions and an external diameter slightly less than the internal diameter of said pipe, a sheath of semi-elastic thin material encasing the helical member and having its interior snugly engaging the exterior of the convolutions of said member so as to reduce the resiliency of the member only to the extent sufficient to prevent undue deformation thereof and of said pipe adjacent the coupling as well as excessive separation of said convolutions which might cause damaging of the sheath, said sheath being film-like and having a radial thickness much less than the wall thickness of said member, the sheath being free from attachment to said member and both said sheath and member being free from attachment to said pipe whereby said sheath and member may undergo restricted movement relative to each other and to said pipe, as may the convolutions of said member with respect to one another, and thereby amplify the area of deformation longitudinally of said support and pipe so as to prevent the creation of stress and flexures of small amplitude in said support and pipe adjacent said coupling.

2. The method of reinforcing plastic pipe at its connection to a rigid pressure coupling or other pressure fitting comprising inserting into the interior of said plastic pipe at the end thereof connected into said pressure coupling an internal support comprising a helical resilient member having contiguous convolutions and an external diameter slightly less than the internal diameter of the pipe, and a sheath of semi-elastic thin material encasing the helical member and having its interior snugly engaging the exterior of the convolutions of said member so as to reduce the resiliency of the member only to the extent sufficient to prevent undue deformation thereof and of said pipe adjacent the coupling as well as excessive separation of said convolutions which might damage the sheath, said sheath being film-like and having a radial thickness much less than the wall thickness of the member, the sheath and member being free from attachment to each other and to said pipe whereby said sheath and member may undergo limited movement relative to each other and to said pipe, as may the convolutions of said member with respect to one another, and thereby amplify the area of deformation longitudinally of said support and pipe so as to prevent the creation of stress and acute flexures in said support and pipe adjacent said coupling.

* * * * *